3,360,650
APPARATUS FOR ULTRAVIOLET SOURCE STABILIZATION IN EXPOSURE TESTING
Henry C. Lawrence, Warren Township, Somerset County, N.J., assignor to American Cyanamid Company, New York, N.Y., a corporation of Maine
Filed Feb. 12, 1964, Ser. No. 344,383
1 Claim. (Cl. 250—83.3)

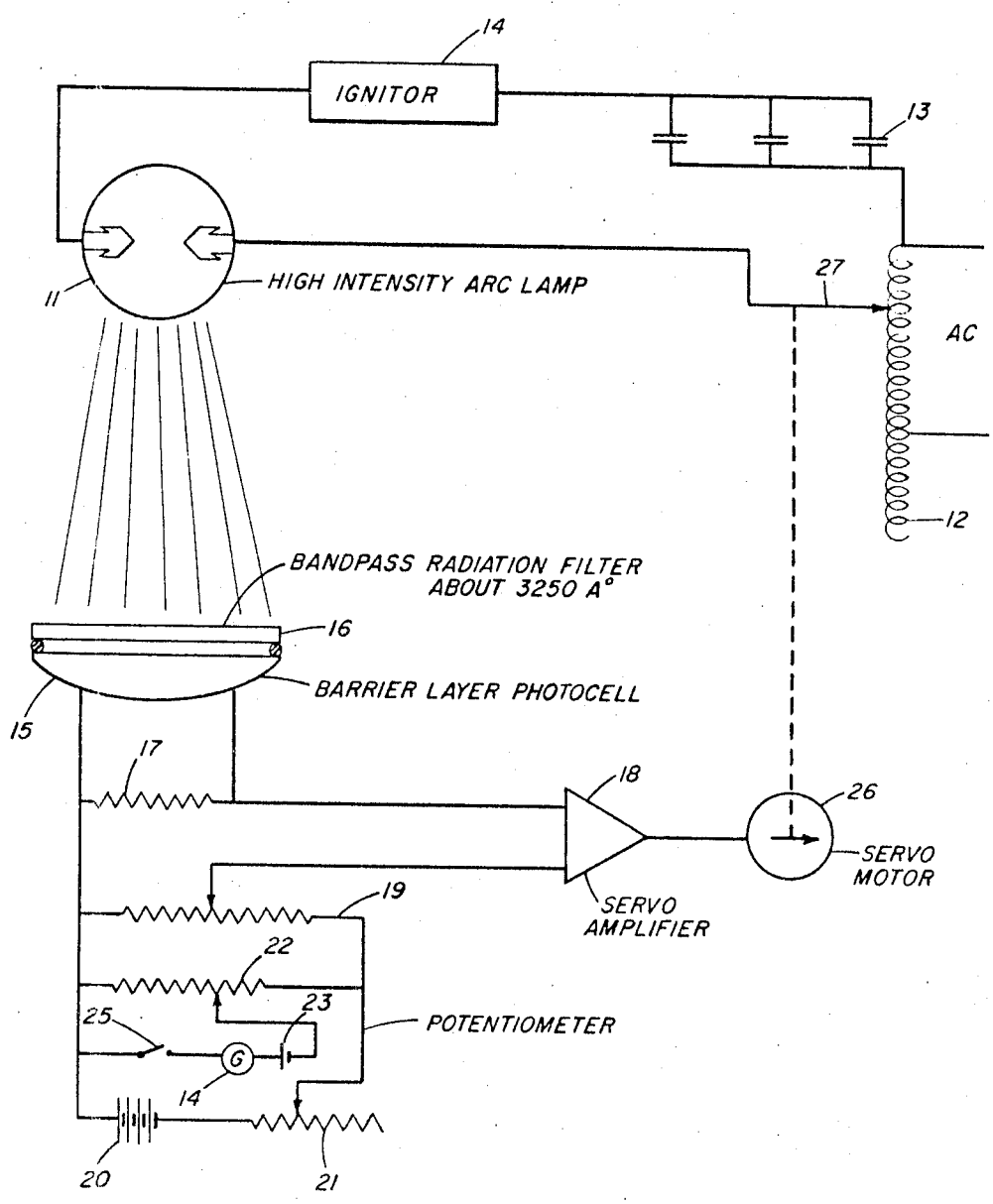

This invention relates to a method and apparatus for controlling the radiant energy emitted in exposure testing devices so that the source level in a selected frequency band is constant and hence the effect of exposure time is constant.

The effects of light, including visible, ultraviolet, and infrared, on weathering of plastics, paints, dyes, textiles, and other materials of construction, and the effect of additives thereon, is becoming of increasing importance. Various devices have been designed to simulate the exposure to radiant energy and weather conditions. Many such devices include a source of radiant energy designed to simulate sunlight. The effects of various frequencies of radiant energy varies with materials being tested. It is difficult to use natural environmental conditions and obtain results within the time required. Accelerated weathering is desirable.

For plastics and many other materials ultraviolet radiation shorter than the visible and in the range of about 3000 to 4500 Angstroms is found to have the greatest effect. Studies on wavelengths and their effects are included in such publications as R. C. Hirt, N. Z. Searle and R. G. Schmitt, "Ultraviolet Degradation of Plastics and the Use of Protective Ultraviolet Absorbers," Society of Plastics Engineers Transactions, vol. 1, No. 1, January 1961; R. C. Hirt, R. G. Schmitt, N. D. Searle, and A. P. Sullivan, "Ultraviolet Spectral Energy Distributions of Natural Sunlight and Accelerated Test Light Sources," The Journal of the Optical Society of America, vol. 50, No. 7, 706–713, July 1960; R. G. Schmitt and R. C. Hirt, "Investigation of the Protective Ultraviolet Absorbers in a Space Environment. I. Rate of Evaporation and Vapor Pressure Studies," Journal of Polymer Science, vol. XLV, pages 35–47 (1960); R. G. Schmitt and R. C. Hirt, "Investigation of the Protective Ultraviolet Absorbers in a Space Environment. II. Photochemical Studies," Journal of Polymer Science, vol. 61, pages 361–380 (1962); and R. G. Schmitt and R. C. Hirt, "Investigation of the Protective Ultraviolet Absorbers in a Space Environment. III. Protective Effectiveness," Journal of Applied Polymer Science, vol. 7, pages 1565–1580 (1963).

In the past it has been difficult to achieve and maintain uniform radiation in testing devices. Hence, comparative results have been used, or attempts made, to empirically settle on standard cycles.

It is desirable to be able to have uniform environmental conditions so that test samples can be placed in environmental chambers at any time and the time in such chambers regarded as the sole effective variable because conditions are constant.

This is difficult because the source of radiant energy needs to be extremely powerful. The most effective sources are xenon arc lamps, or mercury arc lamps, with or without filters, and such radiant energy sources are not uniform. Line voltage can change, usually a short interval change, and the transmission of energy through glass or quartz changes with aging, the light output from a lamp changes with age, and minor amounts of dirt which collect on surfaces cause a change. Hence, it has been customary to attempt to change manually the energy input. Attempts to automatically adjust the energy output in a selected band have been less satisfactory than desirable.

It has now been found that the radiant energy output can be controlled by automatically varying the energy input. The radiant energy output is measured in a selected band, and fed back through an appropriate circuit. For weathering of plastics and many other materials, it is preferred that the energy in the range of about 3250 to 3350 Angstroms be kept constant. The articles cited above show that for different materials the wavelength of greatest interest varies and, accordingly, a preferred wavelength pass band is selected depending upon the materials being tested.

An embodiment of the present invention is shown in the accompanying drawing in which 11 is a high intensity arc. A typical high intensity source is a xenon arc lamp, such as sold by Osram, which draws about 6000 watts at around 220 volts AC. The power to this high intensity arc lamp is supplied from an AC source through a variable autotransformer 12. The autotransformer feeds through a bank of capacitors 13 of about 500 microfarads total capacity with a rating of 300 volts AC, which acts as a current limiter. The arc lamp tends to draw more current after it has been ignited and some type of current limiting device is required, either separately or designed into the transformer. Straight resistors dissipate considerable energy. Either a capacitive or inductive current limiting reactor gives more effective control as the current limiting device itself consumes very little power and the change in phase angle causes stabilization with a minimum of power losses. An inductance or magnetic amplifier can be used with good results but the capacitors as shown accomplish limiting more economically. Also, in the circuit is an igniter 14 designed to give a comparatively high voltage surge as a starting current to strike the arc. As much as 20,000 volts may be needed to strike an arc. A high frequency very small current is preferred to strike the arc, and once struck the arc remains conductive.

A portion of the radiant energy output from the arc lamp impinges on a barrier layer photocell 15 through a band pass radiation filter 16. Conveniently the band pass radiation filter is an interference filter, such as obtained by evaporating alternate layers of metal and a dielectric on a glass surface with layers being of such thickness that the desired spectral band is passed and enough layers being used that the band is as narrow as desired. Excellent interference filters are obtainable commercially as the "Balzar" or "Schott," having a peak transmission around 3280 to 3320 Angstroms, with a half peak width of 100 to 200 Angstroms, and no appreciable transmittance below 3000 Angstroms or above 3900 Angstroms. Obviously, different interference filters can be selected which will pass and hence monitor a band having the greatest significance for the samples in the test. Behind the band pass radiation filter, and receiving transmitted energy, is the barrier layer photocell 16. One such device is the "A 15 M Photocell" supplied by International Rectifier Co. Across this photocell is the stabilizing resistor 17. Conveniently this may be about 390 ohms and if so selected the interference filter photocell resistor combination gives a voltage output across the resistor linear with intensity of ultraviolet light in the selected frequency band. The voltage across the stabilizer resistor is fed through a servo amplifier 18 and bucked by a set point potentiometer 19. The set point potentiometer is any adjustable stable millivolt source that gives an adjustable stable voltage of from 0 to 150 millivolts. One convenient circuit is from a battery 20 through a zero adjusting resistor 21 which imposes a constant voltage across the set point potentiometer 19. An appropriate voltage may be picked off by a multiple-turn or helical potentiometer, or slide wire. The voltage is checked by a standardizing potentiometer 22 which is set to an appropriate control point and bucks the voltage from a standard cell 23, adjusted to the null, by means of a galvanometer 24 and a switch 25.

Other commercial potentiometer circuits may be used to obtain the stable adjustable bucking voltage for the servo amplifier circuit. The servo amplifier 18 controls a servo motor 26 which servo motor controls the position of the variable voltage contact 27 of the autotransformer 12.

In use the filtered radiation from the high intensity arc striking the photocell sets up a voltage which is bucked to a null with the servo amplifier driving the servo amplifier to control the variable voltage contact in the autotransformer to deliver such voltage as is required to drive the high intensity arc to the standardized output.

The servo amplifier-servo motor system is designed with a comparatively long time constant, as electronic controls go, so that random noise or short-term electric transients from the power supply do not change the position of the servo motor. A time constant of at least ½ second is usually preferred and time constants of up to 5 minutes or more give adequate control so that intensity is essentially constant without the servo motor and variable voltage contact being unduly active and hence subject to wear.

Few samples are exposed for less than twenty minutes and a much more usual weathering test would include a range of up to at least 80 hours exposure and in many instances much more. The output of the high intensity arc lamps may give an accelerated aging that is several times that of the aging rate in natural sunlight. Of course, attempts are made to obtain test samples which will have minimum change on exposure, and as the state of the art improves the duration to failure or a preselected degeneration point increases. Samples which have complete indifference to the effect of radiation, water, moisture, and oxygen, and hence permanent resistance to weathering, is an ultimate objective for the testing program. Hence, longer exposure times become of interest.

As is obvious to those skilled in the art, other types of radiation measuring devices and other light sources may be used. It is desirable that the radiation monitoring photocells have minimum variation with age and the source of radiation is chosen to deliver a spectrum selected for specific tests. With these limitations, those skilled in the art are able to modify the device of this invention described in the above example, but within the limits of the appended claims.

I claim:

In accelerated environmental testing with ultraviolet radiant energy over an extended testing period the combination of
 a high intensity arc lamp,
 a current limiting reactor in series with said arc lamp,
 a variable voltage alternating current power source connected to deliver energy through said reactor to said arc lamp,
 a band pass radiation filter, passing a narrow band of radiation from said arc lamp in a portion of the spectrum of primary interest, which filter has a peak transmittance between 3250 and 3350 Angstroms, a half width peak of not greater than 200 Angstroms and no appreciable transmittance below 3000 Angstroms or above 3900 Angstroms,
 a photocell which receives the radiation passing through the filter, the output of which photocell is proportional to the incident radiant energy in the selected band from said arc lamp,
 a source of constant potential adjustable to the desired output from said photocell,
 a servo amplifier connected to buck the output from the photocell and from the constant voltage source,
 a servo motor driven by said servo amplifier and connected to said variable voltage source to change the voltage output from the variable voltage source to said arc lamp to such a point that the photocell and adjustable constant potential are the same,
 said servo amplifier and said servo motor having, as a system, a time constant for response of the order of one-half second or more whereby random noise and short-term transients are ignored by the servo system.

References Cited
UNITED STATES PATENTS 2,245,124  6/1941  Bonn _____ 250—212 X
3,051,869  8/1962  Richards _____ 88—23

RALPH G. NILSON, *Primary Examiner.*

M. A. LEAVITT, *Assistant Examiner.*